(No Model.)

A. KANTNER.
DRIVING BELT COUPLING.

No. 320,140. Patented June 16, 1885.

WITNESSES:
Wm A. Lowe
Robt Roy.

INVENTOR
Alexander Kantner
BY
Roeder & Briesen
ATTORNEYS

UNITED STATES PATENT OFFICE.

ALEXANDER KANTNER, OF PHILADELPHIA, PENNSYLVANIA.

DRIVING-BELT COUPLING.

SPECIFICATION forming part of Letters Patent No. 320,140, dated June 16, 1885.

Application filed March 31, 1885. (No model.)

*To all whom it may concern:*

Be it known that I, ALEXANDER KANTNER, of the city of Philadelphia, in the county of Philadelphia and State of Pennsylvania, have invented a new and Improved Driving-Belt, of which the following specification is a full, clear, and exact description.

This invention relates to a driving-belt to be used for transmitting power in different kinds of machines.

The invention relates more particularly to the improved manner of attaching the couplings to the ends of a belt made of cord or rope; and it consists, principally, in the combination of a cord with a sectional coupling provided with an encircling nut, and with a pin and corresponding perforation.

The invention also consists in the details of improvement hereinafter more fully pointed out.

Figure 1:
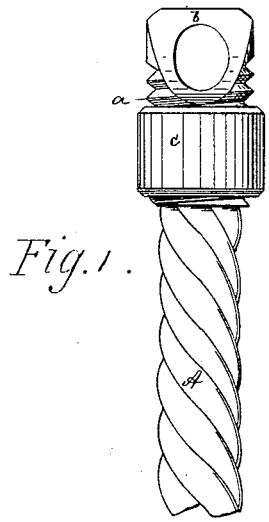
Figure 2:
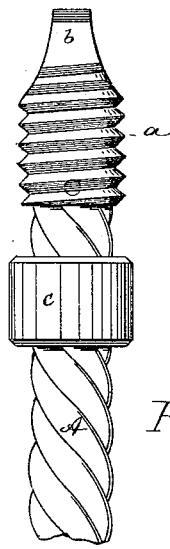
Figure 3:
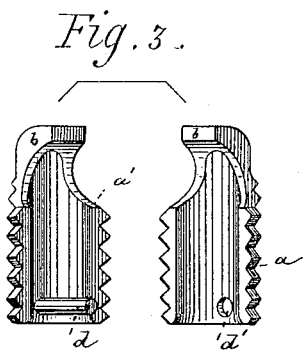
Figure 4:
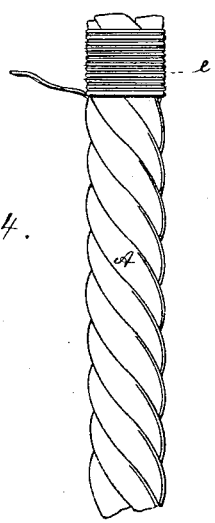
Figure 5:
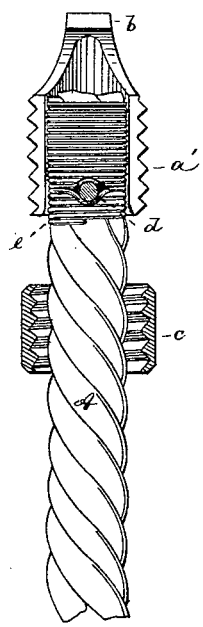

In the accompanying drawings, Figure 1 is a side view of a belt provided with my improvement. Fig. 2 is a similar view with the nut unscrewed; Fig. 3, a perspective view of the two halves of the coupling; Fig. 4, a side view of one end of the belt before it is connected to the coupling; Fig. 5, a longitudinal section through the belt and coupling with the nut unscrewed.

The letter A represents a cord consisting of two or more strands of cotton, silk, flax, or other appropriate material twisted together.

$a\ a'$ are the two halves or sections of the coupling. These halves are each of semi-tubular form, and are provided with teeth at their edges, so as to interlock when placed against each other. At their ends the sections $a\ a'$ are provided with lugs $b$, which form an eye when the sections are joined. At their exterior a thread is cut around sections $a\ a'$, and this thread is engaged by a nut, $c$, which, when screwed around sections $a\ a'$, binds them properly together.

$d$ is a pin rigidly attached to section $a'$, and engaging a small perforation, $d'$, in the section $a$.

Around the end of cord A is first tightly wound a thread, $e$, as shown. This serves to bind the strands of the cord together. The section $a'$ is then placed against the end of cord A, and the pin $d$ is passed through two adjacent loops of thread, $e$. Next the section $a$ is fitted against section $a'$, and, finally, the nut $c$ is screwed up to bind all the parts together.

It will be seen that by making the coupling sectional I am enabled to pass the pin $d$ through the loops of thread $e$.

I claim as my invention—

1. The combination of cord A with sectional coupling $a\ a'$, the section $a'$ having inwardly-projecting pin $d$, and the section $a$ having corresponding perforation $d'$, and with nut $c$, substantially as specified.

2. The combination of cord A with encircling thread $e$ and sectional coupling $a\ a'$, having pin $d$ and perforation $d'$, the pins $d$ passing between two of the loops of thread $e$, as set forth.

ALEXANDER KANTNER.

Witnesses:
 WM. KATEBY,
 RICHARD KENNY.